UNITED STATES PATENT OFFICE.

EMIL FISCHER, OF BERLIN, GERMANY, ASSIGNOR TO C. F. BOEHRINGER & SOEHNE, OF WALDHOF, GERMANY.

OXYPURIN AND PROCESS OF MAKING SAME.

SPECIFICATION forming part of Letters Patent No. 647,392, dated April 10, 1900.

Application filed January 31, 1898. Serial No. 668,648. (Specimens.)

*To all whom it may concern:*

Be it known that I, EMIL FISCHER, a citizen of the Empire of Germany, residing at Berlin, in the Empire of Germany, have invented certain new and useful Improvements in the Manufacture of Oxypurins; and I do hereby declare the following to be a full, clear, and exact description of the invention, such as will enable others skilled in the art to which it appertains to make and use the same.

The present invention relates to the preparation of oxy-purins and their alkyl derivatives, and particularly the production of a series of bodies starting from trichloropurin, a compound which is described in Letters Patent of the United States No. 598,502, dated February 8, 1898.

My invention has for its specific object the preparation from trichloropurin of the dichloro-alkyl-oxypurins, which bodies may be directly or indirectly converted into hypoxanthin.

Before proceeding with the description it should be stated that the nomenclature herein followed is that adopted by the article published in *Berichte der Deutschen Chemischen Gesellschaft*, Vol. 30, page 549. According to this nomenclature a large number of bodies—such as caffein, uric acid, guanin, adenin, &c.—are designated by the generic term "purins," and their nucleus, the "purin group," has its several carbon and nitrogen atoms numbered in the following manner:

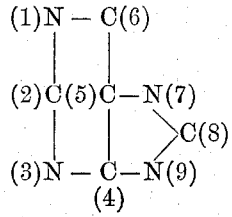

Bearing this nomenclature and system of numbering the position of the atoms in the molecule in mind, the use of terms in the following description will be readily understood.

My invention consists in the new oxypurin 2-8-dichloro-6-alkyl-oxypurin and the process of preparing the same and in such further features and details as will be set forth below and pointed out in the claims hereunto annexed.

In the detailed description of the invention now to follow I will set forth the methods of preparing dichloro-ethoxy-purin and dichloro-methoxy-purin. The proportions given are all understood to be by weight.

1. *Preparation of 2-8-dichloro-6-ethoxypurin.*—Four parts dry trichloropurin, whose properties and mode of preparation are set forth in my aforesaid Patent, No. 598,502, are dissolved in sixteen parts of alcohol, and this solution, after being rapidly cooled to about 10° to 15° centigrade and which, as a rule, has a tendency to throw out crystals of the trichloropurin, is added to a solution of one and two-tenths parts of sodium in twenty-four parts of alcohol cooled to room temperature. A clear pale-yellow liquid results, which becomes spontaneously heated to about 30° centigrade and soon becomes turbid by reason of a precipitation of sodium-chlorid. The mixture is allowed to stand at ordinary temperature for three hours, whereupon fifty parts of water are added, and the whole is supersaturated slightly with acetic acid for the purpose of neutralizing the alkali. Other acids, such as hydrochloric acid and sulfuric acid, may be employed to this end; but in the case of mineral acids it is to be observed that no heat should be employed, as otherwise decomposition of the methoxy compound takes place. The alcohol is then evaporated off, whereby the dichloro-ethoxy-purin is precipitated in colorless very flexible acicular crystals. The same is then purified by recrystallization from hot benzene. Its formula is $C_7H_6Cl_2N_4O$ or

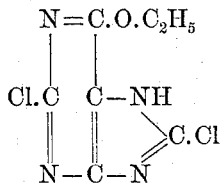

It softens at about 190° centigrade and melts completely at about 200° centigrade, the fusion being accompanied by decomposition. It is soluble only with difficulty in hot water, but dissolves readily in hot alcohol and acetone.

The above converting process proceeds according to the equation:

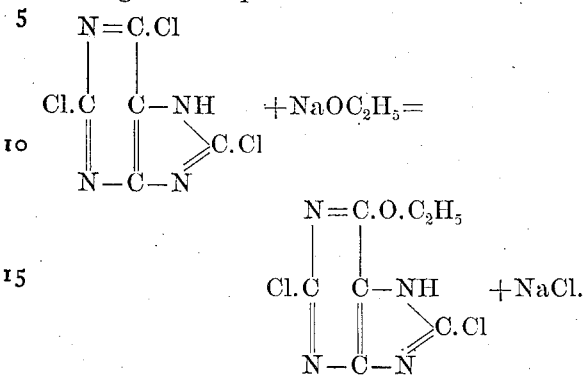

2. *Preparation of 2-8-dichloro-6-methoxypurin.*—If in the place of the ethyl-alcoholic solution a methyl-alcoholic solution of sodium is employed, the other ingredients and conditions of the above process remaining the same, I obtain 2-8-dichloro-6-methoxypurin, which melts and decomposes at about 225° centigrade and which is considerably less soluble in benzene than the ethoxy compound.

The generic formula for both of the oxyalkyl-dichloro-purins is—

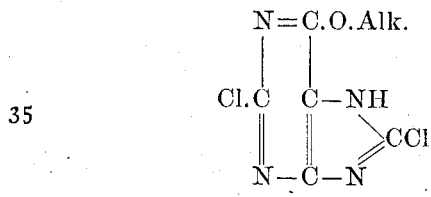

These new compounds, the dichloro-alkyl-oxypurins, may, as set forth in my applications, Serial Nos. 668,644 and 668,647, filed concurrently herewith, be converted into hypoxanthin either directly by treating it with a reducing agent or indirectly by first dealkylizing and then submitting the resultant 6-oxy-2-8-dichloropurin to reduction. The latter method is not herein claimed, since it is covered in my aforesaid application, Serial No. 668,647. The former method is, however, specifically claimed herein; but the two methods are generically covered in said application, Serial No. 668,644. As set forth in said application, Serial No. 668,644, the new compounds, oxy-alkyl-dichloropurins, may by intermediate conversion into 6-oxy-2-8-dichloropurin, followed by alkylization and final reduction, be converted into methylized hypoxanthins, such as 1-7-dimethyl-hypoxanthin, (1-7-dimethyl-6-oxypurin.)

I will now give in detail the direct method of preparing the hypoxanthin and, for the purpose of a fuller disclosure of the utility of the new compound, the indirect method of arriving at the same compound.

*Preparation of Hypoxanthin.*

(a) *Preparation of hypoxanthin from 2-8-dichloro-6-ethoxypurin.*—One part of the finely-powdered dichloro-ethoxypurin is added to ten parts hydrogen-iodid or hydriodic acid of the specific gravity 1.96, and after about one-half part of phosphonium-iodid or yellow phosphorous have been added the whole is first shaken for about an hour at ordinary temperature and then heated on the water-bath until an almost colorless solution is formed. On cooling the hydro-iodate of hypoxanthin is thrown out in the form of beautiful crystals. The entire quantity of this product is obtained by evaporating the hydrogen-iodid. The reaction takes place according to the equation:

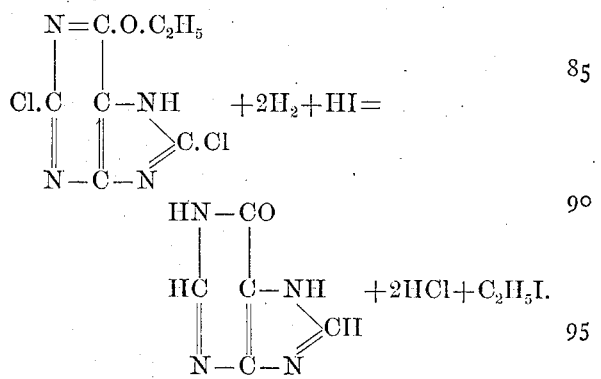

After forming a concentrated aqueous solution of the hydro-iodate the hypoxanthin may be obtained therefrom by neutralizing with ammonia. The product thus obtained is purified by recrystallizing from hot water, animal charcoal being added. The artificial compound thus prepared unites all the properties of natural hypoxanthin or 6-oxy-purin.

(b) *Preparation of hypoxanthin from 2-8-dichloro-6-oxy-purin.*—If in place of the ethoxy-dichloropurin we employ the simple oxy-dichloropurin product, the 2-8-dichloro-6-oxy-purin in the process under (a), all other conditions remaining the same, the said oxy-dichloropurin will lose its two chlorine atoms—that is to say, hypoxanthin or 6-oxy-purin will again result.

*Preparation of 6-oxy-2-8-dichloropurin.*—The 2-8-dichloro-6-ethoxy-purin may be converted into the compound 6-oxy-2-8-dichloropurin employed in process (b) by a mineral acid, preferably a haloid acid. I find the following to be the best manner to carry out this process: I mix powdered 2-8-dichloro-6-ethoxypurin with five times its weight of fuming hydrochloric acid and heat the mixture on the water-bath. Solution rapidly takes place, and the difficultly-soluble 6-oxy-2-8-dichloropurin is soon thrown out in the form of coarse crystals. The conversion will be completed in about a half-hour, after which the whole is diluted with about ten parts of water and allowed to cool, after which the mother-liquor is separated from the crystals by filtration.

For the purpose of complete purification the new body is converted into the potassium-salt, which is completely decolorized by recrystallization from hot water, to which some animal charcoal is added. The oxydichloropurin when recovered from the potassium-salt forms beautiful colorless acicular crystals having the formula $C_5N_4H_2Cl_2O$ or

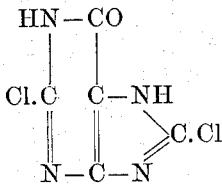

When heated to over 350°, it decomposes and turns brown. It dissolves with considerable difficulty even in hot water. It is more soluble in hot alcohol. Its aqueous solution has an acid reaction and decomposes carbonates. Its barium-salt crystallizes from a hot solution of the same in excess of baryta water in fine needles, usually aggregated into fasces or bunches. Upon adding nitrate of silver to an ammoniacal solution of the purin it forms a colorless amorphous precipitate.

The above process is explained in the following equation:

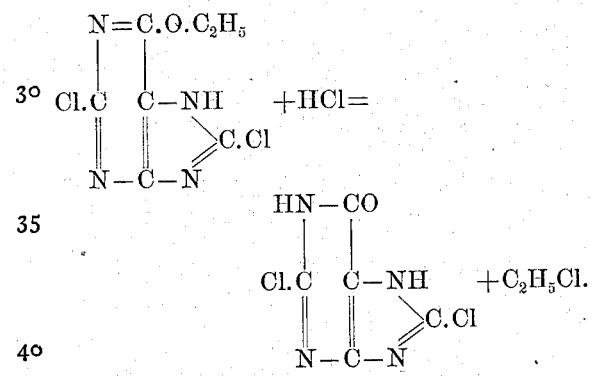

What I claim, and desire to secure by Letters Patent of the United States, is—

1. As a step in the art of preparing oxy-purins and their derivatives, the process which consists in treating tri-chloropurin with an alkaline reagent, substantially as described.

2. As a step in the art of preparing oxy-purins and their derivatives, the process which consists in combining trichloropurin with an alcoholic solution of alkali, cooling the mixture and adding water and then supersaturating with acid.

3. As a step in the art of preparing oxy-purins and their derivatives, the process which consists in dissolving trichloropurin in ethyl-alcohol, cooling the mixture and adding a sodium solution and cooling, allowing the mixture to stand at room temperature, then adding water and finally supersaturating with an acid, all in the proportions substantially as set forth.

4. As a step in the art of preparing oxy-purins and their derivatives, the process which consists in dissolving trichloropurin in ethyl-alcohol, cooling the mixture and adding a sodium solution and cooling, allowing the mixture to stand at room temperature, then adding water and finally supersaturating with acetic acid, all in the proportions substantially as set forth.

5. As a step in the art of preparing oxy-purins and their derivatives, the process which consists in dissolving trichloropurin in ethyl-alcohol, cooling the mixture and adding a sodium solution and cooling, allowing the mixture to stand at room temperature, then adding water and finally supersaturating with acetic acid and then evaporating the alcohol and recrystallizing from hot alcohol.

6. As a new chemical compound, 2-8-dichloro-6-alkyl-oxy-purin having the formula above indicated and which is soluble in alcohol and benzene, which softens at about 100°, centigrade, and melts with decomposition at a high temperature.

7. As a new chemical compound, 2-8-dichloro-6-ethoxy-purin, having the formula above given, which is soluble in hot alcohol and benzene, but soluble with difficulty in hot water, and which begins to soften at about 190°, centigrade, and melts with decomposition at about 200°, centigrade.

8. The process of preparing hypoxanthins which consists in acting upon a 2-8-dichloro-6-alkyl-oxypurin with a reducing agent.

9. The process of preparing hypoxanthins which consists in treating 2-8-dichloro-6-ethoxypurin with a reducing agent.

10. The process which consists in adding hydrogen-iodid and phosphonium-iodid to 2-8-dichloro-6-ethoxypurin and shaking the mixture at ordinary temperature, then heating the same on the water-bath, then cooling, and, finally evaporating the hydrogen-iodid, all substantially as set forth.

In testimony whereof I affix my signature in presence of two witnesses.

EMIL FISCHER.

Witnesses:
  CHAS. H. DAY,
  HENRY HASPER.